United States Patent
Newman

[11] Patent Number: 5,928,488
[45] Date of Patent: Jul. 27, 1999

[54] ELECTROLYTIC SODIUM SULFATE SALT SPLITTER COMPRISING A POLYMERIC ION CONDUCTOR

[75] Inventor: David S. Newman, 939 Carol Rd., Bowling Green, Ohio 43402

[73] Assignee: David S. Newman, Bowling Green, Ohio

[21] Appl. No.: 08/920,099

[22] Filed: Aug. 26, 1997

Related U.S. Application Data

[51] Int. Cl.$^6$ ............................................. B01D 61/44
[52] U.S. Cl. ..................... 205/510; 205/554; 204/531; 204/630; 204/252; 204/263; 204/296
[58] Field of Search ..................... 205/554, 510; 204/531, 263, 252, 630, 296

[56] References Cited

U.S. PATENT DOCUMENTS

| | | | |
|---|---|---|---|
| 3,884,778 | 5/1975 | Eng et al. | 205/554 |
| 5,094,732 | 3/1992 | Oldani et al. | 204/539 |
| 5,227,031 | 7/1993 | Sundblad | 205/554 |
| 5,595,641 | 1/1997 | Traini et al. | 205/554 |
| 5,622,614 | 4/1997 | Keating et al. | 205/554 |

Primary Examiner—Arun S. Phasge
Attorney, Agent, or Firm—Dennis H. Rainear

[57] ABSTRACT

The invention relates to an electrochemical process for the production of sodium hydroxide and sulfuric acid from aqueous sodium sulfate solutions, said process comprising the feeding of an aqueous sodium sulfate solution into a salt splitter device comprising at least three compartments including a middle feed compartment which is between an anode compartment and a cathode compartment, wherein the feed compartment is separated from the anode compartment by a chemically-functionalized anion exchange membrane, and wherein the feed compartment is separated from the cathode compartment by a chemically-functionalized cation exchange membrane. Specifically, the chemically-functionalized anion exchange membrane of the present invention is a perfluorohydrocarbon polymer material to which has been grafted a plurality of benzo-crown ether groups which have been complexed with a metal ion selected from sodium, potassium and lithium. Additionally, the chemically-functionalized cation exchange membrane is a perfluorohydrocarbon polymer material containing hydrolyzable ester groups, wherein said ester groups have been at least partially hydrolyzed to the carboxylic acid form.

12 Claims, 3 Drawing Sheets

ELECTROLYTIC SODIUM SULFATE SALT SPLITTER COMPRISING A POLYMERIC ION CONDUCTOR

BACKGROUND OF THE INVENTION

Field of the Invention

This invention relates to manufacturing sodium hydroxide and ammonium sulfate or sulfuric acid by electrolysis using one or more semipermeable membranes. More particularly, the invention relates to a multicompartment electrolytic sodium sulfate splitter comprising an inert polymeric cation conductor and a polymeric anion conductor.

Sodium sulfate has been a major waste product of the pulp and paper industry for years. More recently, the destruction of certain chemical weapons has lead to a significant increase in dangerously contaminated $Na_2SO_4$, which is a byproduct of the incineration of many of these weapons.

Sodium sulfate can be converted to sodium hydroxide and sulfuric acid by the reaction shown below:

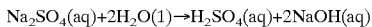

$$Na_2SO_4(aq)+2H_2O(l) \rightarrow H_2SO_4(aq)+2NaOH(aq)$$

The electrolytic production of acids and alkalis from sodium sulfate solution dates back to 1923 when Harold Atwell investigated the practicality of recovering caustic soda and sulfuric acid of satisfactory concentration and purity by the electrolysis of sodium sulfate solutions. Most of the processes employed to date have been centered around the use of ion-permeable polymer membranes. Membrane electrolysis and bipolar membrane electrodialysis are possible routes for converting salts into their corresponding acids and bases.

The most direct process for producing sodium hydroxide from sodium sulfate is the electrolytic conversion of an aqueous solution of sodium sulfate into aqueous solutions of sulfuric acid and caustic soda. Numerous implementations of this process are known in the prior art. Most of them make use of electrolytic cells employing diaphragms or ion permeable membranes to separate the product solutions from the feed solutions, thus avoiding contamination of the products by the feedstock material.

Salt splitters of the prior art have utilized single compartments and multiple compartments. For example, U.S. Pat. No. 5,230,779 (Martin) teaches a two compartment salt splitter device which utilizes a selective ion exchange membrane.

In a two compartment salt splitter cell, an anion selective or cation selective membrane may be used to separate the anode from the cathode compartment. Where the sodium sulfate solution is fed depends on what membrane is used. When a cation selective membrane is used, the sodium sulfate solution will be fed into the anode compartment where it is converted to sulfuric acid and oxygen. The sodium atoms then migrate across the membrane to the cathode compartment where they combine with the hydroxyl ions to form sodium hydroxide. With an anion selective membrane, the sodium sulfate solution is fed into the anode compartment, and the sulfate ions and bisulfate ions migrate into the anode compartment where they combine with the hydroxide ions to form sodium hydroxide at the cathode compartment.

U.S. Pat. No. 2,829,095 discloses a process for the production of acidic and alkaline solutions by electrolysis of a salt solution in a multi-compartment electrolytic cell partitioned by a plurality of anion and cation exchange membranes. The patent also discloses the use of the process for direct production of sodium hydroxide and sulfuric acid from Glauber's salt (sodium sulfate decahydrate).

U.S. Pat. Nos. 3,135,573 and 3,222,267 claim a method and apparatus for converting aqueous electrolytic salt solutions to their corresponding acid and base solutions. A three or four compartment electrolytic cell separated by a cation exchange membrane and one or two porous, non-selective diaphragms is used for this purpose. When a solution of sodium sulfate is used as the salt solution, solutions of sodium hydroxide and sulfuric acid or sodium bisulfate are produced.

U.S. Pat. No. 3,398,069 claims a process for the electrolysis of an aqueous saline electrolyte in a multicellular device having cells separated by gas permeable electrodes and further partitioned by microporous fluid permeable diaphragms or ion-permselective membranes. When applied to a solution of sodium sulfate, the process produces solutions of sodium hydroxide and sulfuric acid.

U.S. Pat. No. 3,907,654 discloses an electrolytic cell particularly useful in electrolysis of sodium sulfate to form sulfuric acid and sodium hydroxide. The cell, which does not employ an ion permeable membranes, comprises a housing having a parent solution chamber and two electrode compartments located on the lower side of the housing and separated from each other but in communication with the parent solution chamber and two electrode compartments located on the lower side of the housing and separated from each other but in communication with the parent solution chamber and positioned vertically beneath or above. Mounted within the electrode compartments are an anode and a cathode, each of which is porous to permit passage of a product solution therethrough. The product solutions of sodium hydroxide and sulfuric acid separated by gravity forces are withdrawn through the porous electrodes.

U.S. Pat. No. 4,561,945 claims a process for producing sulfuric acid and caustic soda by electrolysis of an alkali metal sulfate in a three compartment membrane cell having a hydrogen depolarized anode. Hydrogen gas in the anode chamber is oxidized to produce hydrogen cations which migrate to the central (buffer) chamber through a membrane and combine with the sulfate anions from the alkali metal sulfate solution to produce sulfuric acid. Alkali metal ions are transported across another membrane to the cathode chamber to produce caustic and gaseous hydrogen. Both membranes used in the cell are cation selective membranes.

A similar process for increasing concentration of sulfuric acid in solutions containing an alkali metal sulfate, sulfuric acid and alkaline earth metal ions is disclosed in U.S. Pat. No. 4,613,416. Also in this case the anode compartment and the cathode compartment of a three compartment cell are each bounded by cation exchange membranes.

The development of ion selective membranes has also promoted the use of three compartment electrochemical cells partitioned by both cation and anion selective membranes. The use of such a cell for electrolysis of sodium sulfate has been disclosed, for example, by J. P. Millington ("An electrochemical unit for the recovery of sodium hydroxide and sulfuric acid from waste streams", in Ion-Exchange Membranes, D. S. Flett, Ed., Ellis Harwood Ltd. Publishers, Chichester, 1983, p.195).

In a similar manner, U.S. Pat. No. 5,098,532 (Thompson et al.) teaches a three chamber salt splitter device which utilizes ion selective polymers to separate the anode compartment and the cathode compartment from the sodium sulfate feed compartment. Thompson et al. teaches preferred cation exchange membranes are perfluorinated membranes such as Nafion and Flemion brand membranes, which are said to show good stability for sodium hydroxide concentration up to 50%.

Salt splitters of the prior art suffer from poor economics and less than optimum efficiency. In addition, corrosion during the electrolysis process has been a problem. Also, protons always manage to pass through the anion conducting polymer membrane material to some extent. It would therefore be desirable to have a salt splitter device which can solve these and other problems of the prior art devices.

SUMMARY OF THE INVENTION

The present invention provides an electrochemical process for the production of sodium hydroxide and sulfuric acid from aqueous sodium sulfate solutions, said process comprising the feeding of an aqueous sodium sulfate solution into the feed compartment of a salt splitter device comprising at least three chambers; said middle feed compartment which is between an anode compartment and a cathode compartment, wherein the feed compartment is separated from the anode compartment by an anion exchange membrane, and wherein the feed compartment is separated from the cathode compartment by a cation exchange membrane.

In another embodiment the present invention provides an electrolytic method and device for the destruction of chemical waste streams and/or chemical weapons comprising inter alia aqueous sodium sulfate solutions, said method comprising feeding an aqueous sodium sulfate solution into a first compartment of a three compartment salt splitter device or cell, wherein said first compartment is separated from a second anode compartment by an anion selective perfluorohydrocarbon polymer membrane and said first compartment is separated from a third cathode compartment by a cation selective perfluorohydrocarbon polymer membrane, wherein said anion selective membrane is a perfluorohydrocarbon polymer material to which has been grafted a plurality of benzo-crown ether groups which have been complexed with a metal ion selected from the group consisting of sodium, potassium and lithium, and wherein said cation selective membrane is a perfluorohydrocarbon polymer material containing ester groups in which the ester groups have been hydrolyzed to the carboxylic acid form.

In particular, the ion exchange membranes useful in the present invention are particularly functionalized or derivatized to surprisingly enhance their separation and permeability qualities relative to the membranes used in salt splitter devices of the prior art.

BRIEF DESCRIPTIONS OF THE DRAWINGS

Figure 1:
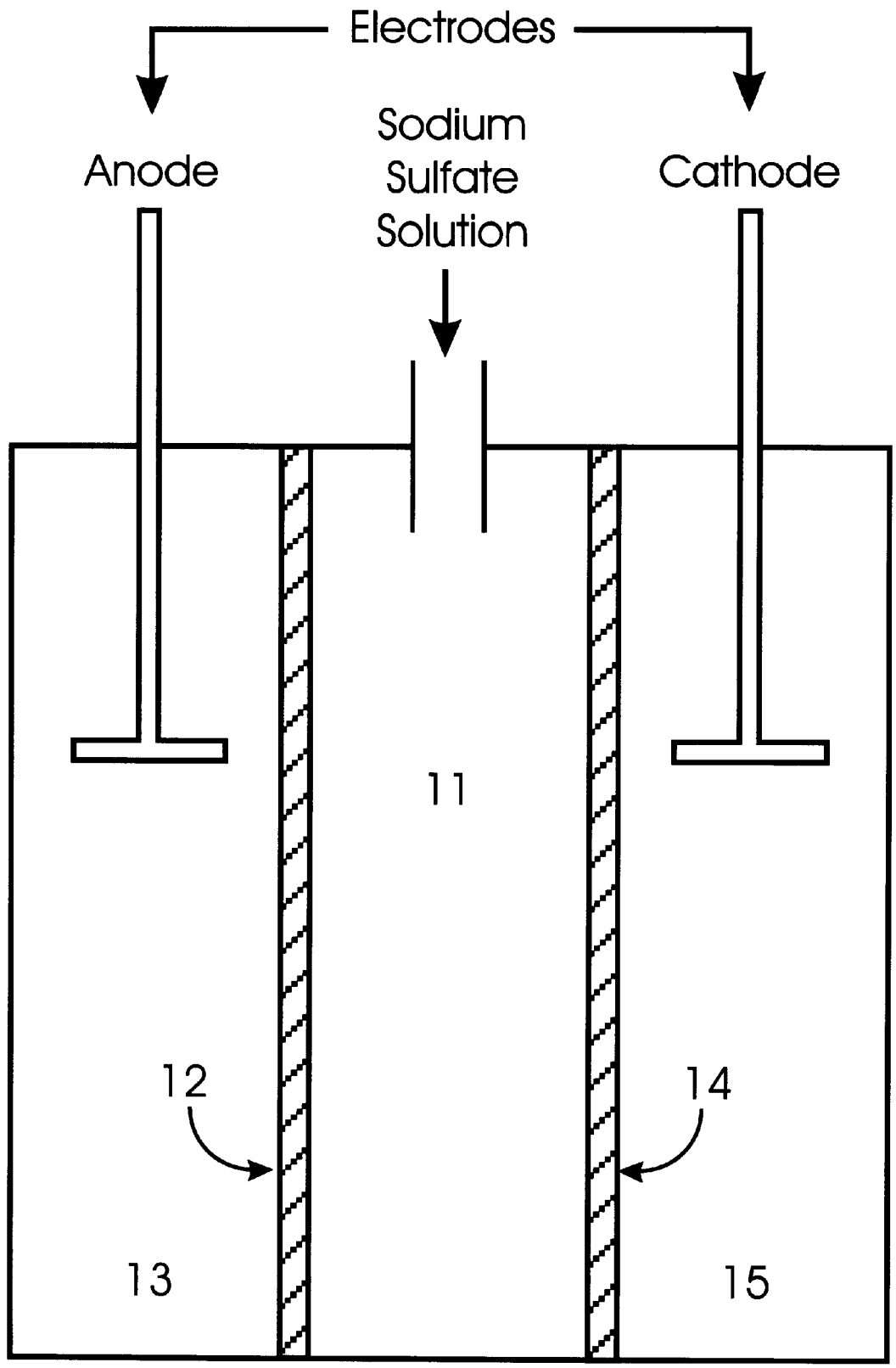
FIG. 1 illustrates a schematic of one embodiment of a three compartment salt splitter device of the present invention.

According to the present invention, a multicompartment salt splitter cell or device is provided which receives aqueous sodium sulfate solution into its central feed compartment. Next to, around, adjoining or otherwise near said feed compartment are a cathode compartment and an anode compartment. When current is passed through the cell, sodium ions migrate through the cation selective membrane into the cathode compartment and combine with the hydroxyl ions to form sodium hydroxide. Sulfate ions migrate through the anion selective membrane, and combine with protons at the anode compartment to produce sulfuric acid.

In another embodiment, the feed compartment is tubular and is surrounded with or by a plurality of anode and cathode compartments radially positioned around the feed compartment. This configuration has the advantage of increased surface area of contact between the feed compartment and the ion exchange membranes positioned between the feed compartment and the anode or cathode compartments. This configuration can be straight or helical.

One particular advantage of the present invention is attained by using at least one and preferably two modified forms, one anion selective and one cation selective, of Flemion as the ion exchange membranes. Thus, in one embodiment of the present invention, Flemion membrane material has been at least partially hydrolyzed, and preferably substantially hydrolyzed, to its carboxylic acid form. As a result, the perfluorocarboxylated Flemion is a relatively inert polymeric cation conductor used to separate the middle or feed compartment from the cathode compartment. By "at least partially hydrolyzed, and preferably substantially hydrolyzed" herein is meant an amount, number or percent of the hydrolyzable groups on the Flemion have been hydrolyzed sufficient to allow the carboxylate ion $COO^-$ to selectively attract positive ions like sodium ions and allow them to pass through the membrane while repelling negatively charged ions. Nafion, which is a tradename for an $SO_3H$ functionalized polymer, may be used as the cation conducting membrane in another embodiment of the present invention.

According to the present invention, the functionalization of the polymer membrane material does not need to be 100%. In fact, functionalization of 20% to 50% of the available chemical sites has proven to be effective in the present invention and 65% functionalization is preferred, but not required.

In another embodiment, the anode compartment is preferably separated from the feed compartment by an anionic conducting form of Flemion. According to the present invention, this was produced by attaching a benzo-crown ether to the Flemion or Nafion polymer backbone and then complexing the crown ether-containing polymer with the alkali metal sulfate. According to the present invention, the alkali metal ion becomes trapped in the crown of the ether forming a positively charged pendent group hanging from the fluorocarbon chain. This positively charged complex allows negatively charged ions to pass through, but prevents positively charged ions from passing through the material. Particularly useful metal ions for complexation herein include a metal ion selected from the group consisting of sodium, potassium and lithium.

Particularly useful crown ethers for derivatizing the Flemion or Nafion can include, but are not limited to, benzo-18-crown-6 ether, dibenzo-18-crown-6 ether, benzo-15-crown-5 ether and benzo-12-crown-4 ether. Other crown ethers known to those skilled in the art will be obvious for use in the present invention and are intended to be within the scope of this invention.

Complexation of the metal ion with the crown ether group can be achieved in the present invention in, for example, acetonitrile, methanol or water as a supersaturated solution. Thus, even if the solubility of the salt is relatively low in the solvent of choice, one can still form the complexed salt on the membrane to thereby impart the desired semipermeable property.

Thus, in one embodiment of the present invention, 18-crown-6 ether was attached to the Flemion polymeric material and the modified polymer was complexed with potassium ions. Similarly, according to the present invention, the 15-crown4 ether was attached to the Flemion polymeric material and complexed with sodium ions, and the 12-crown-4 ether was complexed with lithium ions. These chemically-functionalized polymer materials were then useful as an anion selective membrane in a salt splitter device of the present invention.

In a more preferred embodiment of the present invention, both the anion-permeable membrane and the cation-permeable membrane are modified or derivatized Flemion brand or similar perfluorohydrocarbon polymer material. Thus, perfluorohydrocarbon polymer materials such as Nafion brand polymer which has been derivatized to a cationic conductor form can serve as the separator between the sodium sulfate solution feed chamber and the cathode compartment. Similarly, perfluorohydrocarbon polymer materials such as Nafion or Teflon brand polymer which has been derivatized to an anionic conductor form can serve as the separator between the sodium sulfate solution feed chamber and the anode compartment. These membranes are particularly useful in the present invention because their high molecular weights impart strong mechanical properties, which causes a tight structure to suppress diffusion through the membrane and resist swelling, a property essential for maintaining permselectivity during electrolysis. The perfluorinated structure imparts stability against chlorine and strong acids and alkalis at high temperatures.

One of the key discoveries of the present invention was the concept of bonding Flemion membrane with macrocyclic polyethers, otherwise known as crown ethers, and then complexing the crown ether bonded membranes with metal ions. The complexation of the crown ether bonded membrane with metal ions has provided herein novel Flemion-derivatized membranes useful as ion conductor membrane materials.

Flemion, which contains only methyl ester functional groups, has been successfully further modified herein to play a dual role. To form a cation conductor, the methyl ester functional groups are, by the present invention, at least partially hydrolyzed and converted to a carboxylic acid group by the following reaction:

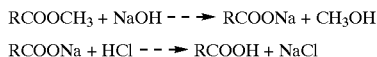

The carboxylic acid group undergoes reorganization in aqueous media to give dissociated carboxylic acid groups. In this state, the carboxylate ion $COO^-$ will selectively attract positive ions like sodium ions and allow them to pass through the membrane while repelling negatively charged ions. The RCOOH form of the membrane can be used as a cation conductor. This RCOOH form of the material can be converted to the acyl chloride to produce acylated Flemion which is then used to acylate the crown ether.

The present invention also relates to a process for the manufacture of sodium hydroxide and sulfuric acid from aqueous sodium sulfate solutions, said process comprising the feeding of an aqueous sodium sulfate solution into a salt splitter device comprising at least three chambers; a middle feed compartment which is between an anode compartment and a cathode compartment, wherein the feed compartment is separated from the anode compartment by a perfluorohydrocarbon anion exchange membrane, and wherein the feed compartment is separated from the cathode compartment by a perfluorohydrocarbon cation exchange membrane.

According to the present invention, differences of 13 pH units between the anode and cathode compartments were routinely achieved. Potassium or sodium contamination of the sulfuric acid was negligible after 40 hours of electrolysis.

Unlike polymeric membranes of the prior art such as Neosepta which leaks protons, the chemically functionalized polymer films of the present invention does not allow leakage of protons through the membrane. More importantly and surprisingly, the anion conducting ability of the exchange membranes of the present invention is virtually independent of pH.

Thus, as confirmation of the present invention, formal chloride ion transport numbers in the zero current limit of Flemion-dibenzo-18-crown-6/K+ and Flemion-benzo-18-crown-6/K+ and benzo-15-crown-5/Na+ were measured using cells with and without transference. The chloride ion transference numbers were found to be one, i.e, unity. The sulfate and bisulfate ion transference numbers will also be one. Similarly, cation transference numbers were measured for the chemically functionalized membranes of the present invention and values equal to or greater than 0.9 were obtained for hydrolyzed Flemion membranes.

As mentioned above, the destruction of certain chemical waste products and chemical weapons has created a need for an efficient, safe and cost effective method of destroying aqueous sodium sulfate solutions. The present invention provides a device and method for the electrolytic destruction of aqueous sodium sulfate solutions, said device comprising a first compartment of a multicompartment salt splitter device or cell, wherein a first compartment is separated from a second anode compartment by an anion selective membrane and said first compartment is separated from a third cathode compartment by a cation selective membrane, wherein said anion selective membrane is a perfluoropolymer material to which has been grafted a plurality of benzo-crown ether groups which have been complexed with a metal ion, and wherein said cation selective membrane is a perfluoropolymer material containing hydrolyzable ester groups in which the ester groups have been at least partially hydrolyzed to the carboxylic acid form. By the present invention, this device can provide the electrolysis of aqueous sodium sulfate solutions to produce sodium hydroxide and sulfuric acid.

In a similar manner, the present invention provides a method for the destruction of chemical waste streams and/or chemical weapons comprising aqueous sodium sulfate solutions, said method comprising feeding an aqueous sodium sulfate solution into a first compartment of a multicompartment salt splitter device or cell, wherein said first compartment is separated from a second anode compartment by an anion selective membrane and said first compartment is separated from a third cathode compartment by a cation selective membrane, wherein said anion selective membrane is a perfluorohydrocarbon polymer material to which has been grafted, chemically bonded or otherwise reacted a plurality of benzo-crown ether groups which have been complexed with a metal ion selected from the group consisting of sodium, potassium and lithium, and wherein said cation selective membrane is a perfluorohydrocarbon polymer material containing ester groups in which the ester groups have been at least partially hydrolyzed to the carboxylic acid form, and preferably substantially hydrolyzed to the carboxylic acid form. In a more preferred embodiment, all or essentially all of the hydrolyzable ester groups have been hydrolyzed.

FIG. 1 illustrates a schematic of one embodiment of a three compartment salt splitter device of the present invention. The central or feed compartment 11 receives the aqueous sodium sulfate solution or the mixture of chemicals or waste streams comprising said sodium sulfate solution. This feed compartment can be of any useful size, shape, construction or pattern, including, for example, a square or rectangular trough, pan or bed, or cylindrical or tubular. The anion exchange membrane polymer 12 separates the anode compartment 13 from the feed compartment 11. The cation exchange membrane polymer 14 separates the cathode compartment 15 from the feed compartment 11.

Figure 2:
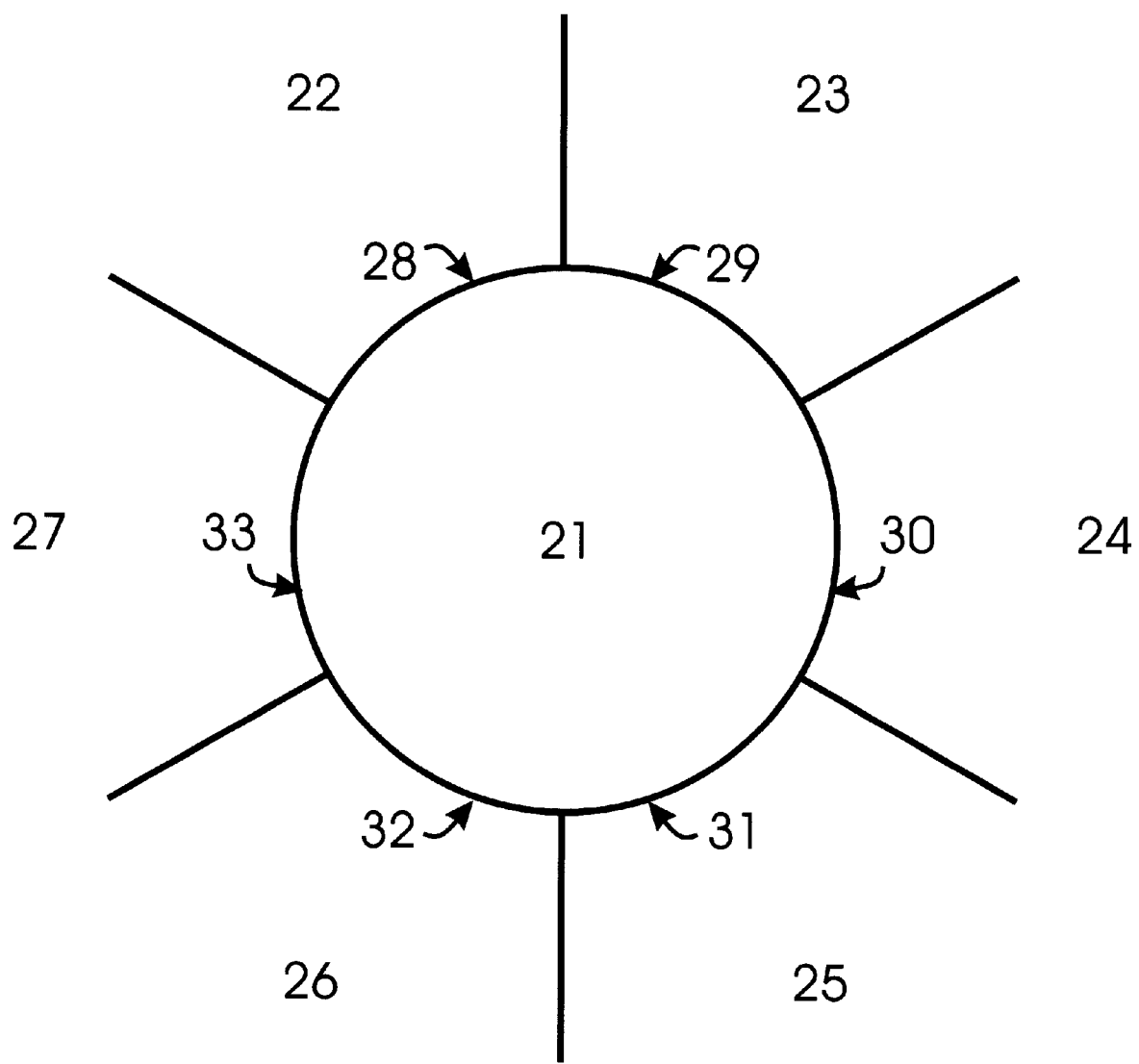
FIG. 2 illustrates one embodiment of the present invention.

FIG. 2 illustrates another embodiment in which the feed compartment 21 is surrounded by anode compartments 22, 24, and 26 and by cathode compartments 23, 25, and 27. The feed compartment 21 is separated from the anode compartments 22 24, and 26 by anion exchange membranes 28, 30, and 32, respectively. In a similar manner, the feed compartment 21 is separated from the cathode compartments 23, 25 and 27 by cation exchange membranes 29, 31, and 33, respectively.

Figure 3:
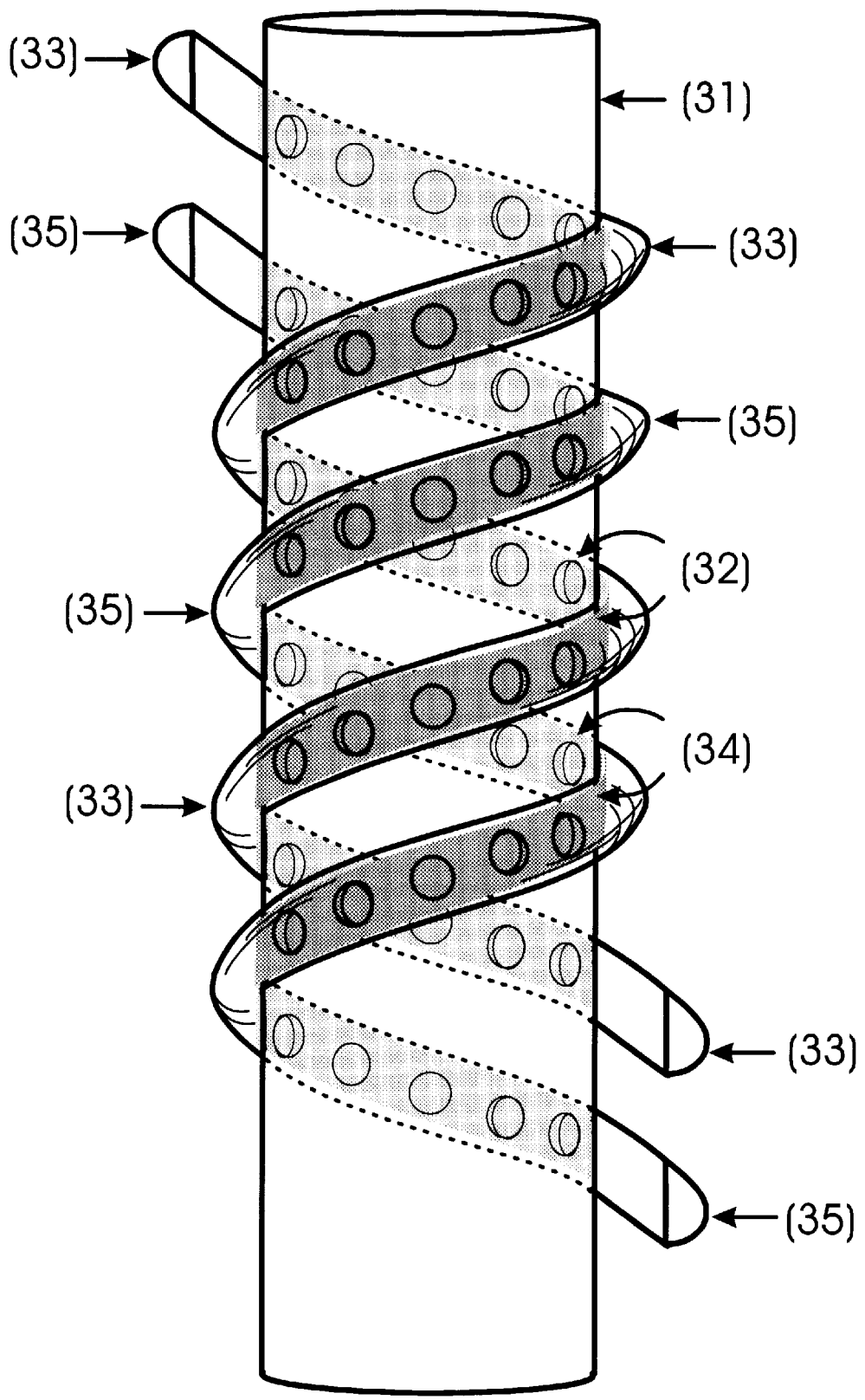
FIG. 3 illustrates a tubular embodiment of the present invention.

FIG. 3 illustrates another design of the present invention, in which the feed compartment 31 is a tube or core through which the feed stream of sodium sulfate solution passes. Spiraled around the feed compartment 31 are positioned in alternating spirals the anode compartment 33 and the cathode compartment 35 being separated respectively from the feed compartment 31 by the anion exchange membrane polymer 32 and the cation exchange membrane polymer 34. This embodiment provides especially efficient use of space and materials in a chemical plant environment as well as facilitating a continuous flow operation.

Flemion membrane can be obtained commercially from Asahi Glass Company Limited, Japan as a clear, transparent polymer film of 0.145 mm thickness. The polymer has an average molecular weight of about 700 and the main functional group is the methyl ester ($COOCH_3$) group. In the present invention, Flemion was modified into cation and anion conducting forms. The cation conducting form can be obtained by hydrolysis reactions, while the anion conducting forms can be made by direct multistep modification methods.

EXAMPLES

Example 1

Preparation of Cation Conducting Membrane

A piece of Flemion membrane approximately 4 $cm^2$ in size was dried in a vacuum oven at 80° C. and weighed on an analytical balance. The membrane was then refluxed in a 25% w/w sodium hydroxide solution for sixteen hours at 90° C. After refluxing, the membrane was soaked in deionized water and then immersed in a solution of 1 M HCl at room temperature. After 24 hors, the membrane was removed and soaked in deionized water for 15 minutes. It was then dried in a vacuum oven at 80° C. for two hours and weighed immediately. This resulted in the hydrolysis of the ester functional groups to form the carboxylic acid functionalized membrane which is ready to be used as a cation conductor.

Example 2

Preparation of Anion Conducting Membrane

The carboxylic acid functionalized Flemion membrane from Example 1 was converted to the acyl chloride form by refluxing it in 40 mL thionyl chloride at 75° C. for 12 hours in a fume hood. After refluxing, the membrane was transferred to a dry box because moisture can convert the acyl chloride back to the carboxylic acid functional group. The membrane was then rinsed with anhydrous ether to remove excess thionyl chloride. The chlorination reaction is illustrated by the reaction equation

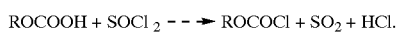

$$ROCOOH + SOCl_2 \dashrightarrow ROCOCl + SO_2 + HCl.$$

The acylated membrane was transferred to a flask containing 0.3 g of the appropriate benzo-crown ether dissolved in 40 mL of $BF_3$ etherate. The contents of the flask were refluxed at 43° C. for 24 hours to convert the acyl chloride membrane to the crown ether form as shown below:

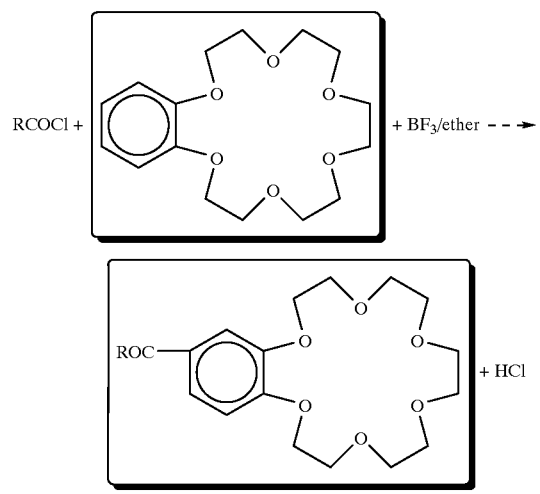

Example 3

Direct Modification

Dried and weighed pieces of unmodified Flemion membranes were immersed in 40 mL of $BF_3$ ether solution containing 0.3 g of the appropriate crown ether and refluxed at 43 degrees C. for 24 hours. This allowed the crown ether to bond directly with the Flemion. The reaction was improved by refluxing the membrane in $BF_3$ ether solution for 48 hours instead of 24 hours.

In the present invention, no limitation is known on the operating molarity of the aqueous sodium sulfate solutions electrolyzed. Samples including 1.5M to 3M sodium sulfate have been utilized in the present invention as the feed stream into the feed compartment and water is fed into the anode and cathode compartments.

As a direct current is then passed from a source across the electrodes, sodium ions from the middle or feed compartment are transported through the cation exchange membrane into the catholyte, whereas sulfate ions and bisulfate ions are transported through the anion exchange membrane into the anolyte. As this transport takes place, hydroxyl ions and protons are produced in the cathode and anode compartments, respectively. The hydrogen and oxygen produced from these reactions is vented. The combined effect is the production of sulfuric acid in the anode compartment and sodium hydroxide in the cathode compartment. The electrolyses using the various combinations of ion exchange membranes of the present invention were allowed to go on for 5 to 120 hours.

The concentrations of sodium and potassium ions in each compartment of the electrolytic cell at specific times were determined using flame atomic absorption spectrophotometry.

As current was passed across the electrodes, the transport of sulfate ions across the anionic membrane led to the formation of sulfuric acid when they combined with protons formed from the electrolysis of water in the anolyte. As the electrolytic process went on, there was a marked drop in the pH of the anolyte and an increase in the pH of the catholyte due to the formation of sulfuric acid and sodium hydroxide, respectively.

Thus in one electrolysis of the present invention, the anion conducting membrane was the acylated benzo-18 crown-6 complexed with $K^+$ ions, the cation conducting membrane was the carboxyl or hydrolyzed form of Flemion, the complexing solvent was acetonitrile, the cell voltage was 6.5 V, the current was 9.0 mA (maximum) and the current density was 3 $mAcm^{-2}$ to 1146 $mAcm^{-2}$. Within one hour, the pH dropped by almost 3 units in the anolyte (from 7.84 to 4.87), with little decrease (about 0.4 units) in the middle compartment. After 24 hours the pH of the middle compartment still showed prevention of back migration of protons across the crown ether membrane. The final (24 hours) pH of the anolyte was 1.5 and the final pH of the catholyte was 12.7.

The present invention is not limited to the examples, explanations and Figures of the present application, but the claims herein shall be deemed to include and encompass those embodiments which are equivalent to the recited claims and which are otherwise apparent to those skilled in the art.

That which is claimed is:

1. A process for the electrolytic manufacture of sodium hydroxide and sulfuric acid from aqueous sodium sulfate solutions, said process comprising the feeding of an aqueous sodium sulfate solution into a feed compartment of a salt splitter device comprising at least the feed compartment which is between an anode compartment and a cathode compartment, wherein the feed compartment is separated from the anode compartment by a chemically functionalized perfluorohydrocarbon anion selective membrane, and wherein the feed compartment is separated from the cathode compartment by a chemically functionalized perfluorohydrocarbon cation selective membrane, wherein the anion selective membrane comprises a perfluorohydrocarbon polymer material to which has been grafted a plurality of benzo-crown ether groups which have been complexed with a metal ion selected from the group consisting of sodium potassium and lithium whereby when a current is passed through the salt splitter device, the sodium ions in the aqueous sodium sulfate solution migrate through the cation selective membrane into the cathode compartment and combine with hydroxyl ions to form sodium hydroxide, and whereby sulfate ions migrate through the anion selective membrane and combine with protons at the anode compartment to produce sulfuric acid.

2. The process of claim 1 wherein at least one of the benzo-crown ether groups is selected from the group consisting of benzo-18-crown-6 ether, dibenzo-18-crown-6 ether, benzo-15-crown-5 ether, benzo-15-crown-4 ether, and benzo-12-crown4 ether.

3. The process of claim 1 wherein the chemically functionalized cation selective membrane comprises perfluorohydrocarbon polymer material containing hydrolyzable ester groups, wherein said ester groups have been at least partially hydrolyzed to the carboxylic acid form.

4. The process of claim 1 wherein the chemically functionalized anion exchange membrane comprises a perfluorohydrocarbon polymer material to which has been grafted a plurality of benzo-crown ether groups, and wherein the chemically functionalized cation exchange membrane comprises perfluorohydrocarbon polymer material containing hydrolyzable ester groups wherein a substantial portion of the ester groups have been hydrolyzed to the carboxylic acid form.

5. The process of claim 1 further comprising electrolyzing the aqueous sodium sulfate solution, whereby sodium ions pass through the chemically functionalized perfluorohydrocarbon cation exchange membrane and sodium hydroxide becomes concentrated within the cathode compartment, and whereby sulfate ions pass through the chemically functionalized perfluorohydrocarbon anion exchange membrane and sulfuric acid becomes concentrated in the anode compartment.

6. A method for the electrolytic destruction of chemical waste streams and/or chemical weapons comprising aqueous sodium sulfate solutions, said method comprising feeding an aqueous sodium sulfate solution into an electrolysis device comprising at least three compartments, wherein a first compartment is separated from a second anode compartment by an anion selective membrane and said first compartment is separated from a third cathode compartment by a cation selective membrane, wherein said anion selective membrane is a perfluorohydrocarbon polymer material to which has been bonded a plurality of benzo-crown ether groups which have been complexed with a metal ion selected from the group consisting of sodium, potassium and lithium, and wherein said cation selective membrane is a perfluorohydrocarbon polymer material containing hydrolyzable groups at least a portion of which have been hydrolyzed to the carboxylic acid form, and wherein said process comprises electrolyzing the aqueous sodium sulfate solution, whereby sodium ions pass through the chemically functionalized perfluorohydrocarbon cation exchange membrane and sodium hydroxide becomes concentrated within the cathode compartment, and whereby sulfate ions pass through the chemically functionalized perfluorohydrocarbon anion exchange membrane and sulfuric acid becomes concentrated in the anode compartment.

7. A device for the destruction of aqueous sodium sulfate solutions, said device comprising at least three compartments, wherein a first compartment is separated from a second anode compartment by an anion selective membrane and said first compartment is separated from a third cathode compartment by a cation selective membrane, wherein said anion selective membrane is a perfluoropolymer material to which has been bonded a plurality of benzo-crown ether groups which have been complexed with a metal ion selected from the group consisting of sodium, potassium and lithium, and wherein said cation selective membrane is a perfluoropolymer material containing hydrolyzable groups wherein at least a portion of the hydrolyzable groups have been at least partially hydrolyzed to the carboxylic acid form.

8. The device of claim 7 wherein the anion exchange membrane comprises a perfluorohydrocarbon polymer material to which has been grafted a plurality of benzo-crown ether groups.

9. The device of claim 8 wherein at least one of the benzo-crown ether groups is selected from the group consisting of benzo-18-crown-6 ether, dibenzo-18-crown-6 ether, benzo-15-crown-5 ether, benzo-15-crown-4 ether, and benzo-12-crown-4 ether.

10. The device of claim 7 wherein the cation exchange membrane comprises perfluorohydrocarbon polymer material containing hydrolyzable ester groups, wherein a substantial portion of said ester groups have been hydrolyzed to the carboxylic acid form.

11. The device of claim 7 wherein the anion exchange membrane comprises a perfluorohydrocarbon polymer material to which has been grafted a plurality of benzo-crown ether groups, and wherein the cation exchange membrane comprises perfluorohydrocarbon polymer material containing hydrolyzable ester groups wherein a substantial portion of the ester groups have been hydrolyzed to the carboxylic acid form.

12. An improved electrolytic cell with at least three compartments comprising a feed compartment, an anode compartment, and a cathode compartment, wherein the feed compartment is separated from the anode compartment by an anion selective membrane, and wherein the feed compartment is separated from the cathode compartment by a cation selective membrane, wherein the improvement comprises use as the anion selective membrane of a material comprising a perfluorohydrocarbon polymer to which has been grafted a plurality of benzo-crown ether groups which have been complexed with a metal ion selected from the group consisting of sodium, potassium and lithium, and use as the cation selective membrane of a material comprising a perfluorohydrocarbon polymer containing hydrolyzable groups at least a portion of which have been hydrolyzed to the carboxylic acid form.

* * * * *